United States Patent [19]

Homilius et al.

[11] 3,955,669

[45] May 11, 1976

[54] CONDUIT MEANS FOR A VIBRATORY CONVEYOR

[75] Inventors: Karl Homilius, Nieder-Ramstadt; Fritz Stoff, Darmstadt; Heinz Saettler, Geroldsheim; Wolfgang Scharmer, Darmstadt-Arheilgen, all of Germany

[73] Assignee: Carl Schenck AG, Darmstadt, Germany

[22] Filed: May 13, 1974

[21] Appl. No.: 469,614

[30] Foreign Application Priority Data

May 18, 1973 Germany.............................. 2325254

[52] U.S. Cl. ......................................... 198/220 BA
[51] Int. Cl.² ......................................... B65G 27/00
[58] Field of Search .............. 198/220 BA, 220 BB, 198/220 BC, 220 A, 160; 302/11, 29, 31, 64; 209/393, 394, 275, 269, 187, 396, 395

[56] References Cited
UNITED STATES PATENTS

| 363,084 | 5/1887 | Riggs .................................. 209/393 |
| 2,697,653 | 12/1954 | Nicholson ............................ 302/29 |
| 2,732,163 | 1/1956 | Senzani ........................ 198/220 BA |
| 2,897,956 | 8/1959 | Damond...................... 198/220 BA |
| 3,087,618 | 4/1963 | Musschoot et al.............. 209/393 X |
| 3,253,865 | 5/1966 | Kanics .................................. 302/29 |
| 3,335,861 | 8/1967 | Musschoot et al. .......... 198/220 BA |

FOREIGN PATENTS OR APPLICATIONS

| 668,179 | 3/1952 | United Kingdom .......... 198/220 BA |
| 1,127,799 | 4/1962 | Germany .............................. 302/29 |
| 1,162,782 | 2/1964 | Germany ............................ 209/396 |
| 1,017,218 | 1/1966 | United Kingdom................... 302/29 |
| 729,178 | 11/1942 | Germany ............................. 302/29 |
| 3,113 | 10/1891 | Sweden ........................ 198/220 BA |

*Primary Examiner*—Frank E. Werner
*Assistant Examiner*—James M. Slattery
*Attorney, Agent, or Firm*—Wolfgang G. Fasse; Willard W. Roberts

[57] ABSTRACT

The present conduit or trough for a vibratory conveyor is constructed especially for transporting and/or treating bulk materials such a wood chips or the like. The trough or conduit is provided inside thereof with partition plates extending substantially across the transport direction. These partition plates take up part of the depth of the trough or conduit and may be arranged at an angle relative to the transport direction. Baffles may be arranged in the conduit or trough to extend away from the partition plates and substantially in the transport direction.

19 Claims, 6 Drawing Figures

CONDUIT MEANS FOR A VIBRATORY CONVEYOR

BACKGROUND OF THE INVENTION

The present invention relates to conduit means such as a trough or chute for a vibratory conveyor apparatus. Such vibratory conveyor or feeder devices are employed for transporting and/or treating of bulk material, for example, wood chips, grain or the like.

Conventional vibratory conveyors usually comprise means for controlling or influencing the motion of the material to be transported. The control generally involves the variation of the oscillatory data, such as the direction of oscillation, the frequency and the amplitude of the oscillation. A further control may be achieved by adjusting the inclination of the trough conduit or chute. Further control is possible by a direct influence on the material, for example, by fluidizing the material with the aid of gases or by adding auxiliary materials to the main material.

Incidentally, in the following text the term "conduit" will be used and it is intended to include in the meaning of such term a trough, as well as a chute.

The above prior art approaches to the control or influencing of the material to be transported have two significant drawbacks. On the one hand any one of the possible control steps will uniformly influence the entire material to be transported whereby it is difficult or virtually impossible to achieve a spot control. On the other hand, varying only one of the above mentioned parameters causes simultaneously a variation of several control components, for example, the feed advance speed, as well as the intermixing of the material being conveyed. As a result, the selection of the parameters which influence the movement of the material being conveyed in prior art vibratory conveyor devices does not cause the most desirable compromises.

Where such prior art vibratory conveyors have been used, for example, for the transporting and simultaneous cleaning of sand including contaminations which are burned out, difficulties have been encountered since the temperatures involved could cause warping of the prior art conduits. This could perhaps be avoided by making the conduits of high alloyed steel. However, such steels are rather expensive. Further, even providing the inner surfaces of prior art conduits with a lining of ceramic materials has not had the desired results because such materials are subject to substantial wear and tear. Hence, the tendency of the ceramic materials to form cracks could not be avoided.

OBJECTS OF THE INVENTION

In view of the above, it is the aim of the invention to achieve the following objects singly or in combination:

to avoid the drawbacks of the prior art, more specifically to provide a conduit for a vibratory conveyor apparatus which may be used for heavy duty operations, such as the conveying of hot or burning sand or gravel without the need for using high alloy steels or ceramic linings;

to provide a conduit for a vibratory conveyor apparatus, in which the motion of the bulk material may be controlled not only in the manner as described above, with regard to prior art devices, but also as a function of the depth of the material above the bottom of the conveyor conduit;

to control the movement of the bulk material through the conduit as a function of the depth of the material above the bottom of the conduit in such a manner that several layers of bulk material are produced in the chute which layers are subject to different motion characteristics, whereby the individual layers shall intermix with each other as little as possible;

to achieve, if desired, such a control over the material moving through the conduits that a uniform intermixing of the bulk material is accomplished over its entire depth while moving through the conduit at a low feed advance speed;

to construct a conduit for a vibratory conveyor in such a manner that at least a portion of the bulk material being conveyed acts as a thermal insulating layer between the bottom of the conduit and the bulk material moving through the conduits; and to reduce the feed advance speed to cause simultaneously an intimate intermixing of the material.

SUMMARY OF THE INVENTION

According to the invention there is provided a trough or conduit for vibratory conveyor apparatus, especially for transporting and/or treating of bulk materials, which is divided along its length by partition plates extending substantially across the transport direction of the bulk materials and taking up at least a portion of the inner height of the conduit. The partition plates may be arranged at an angle which opens in the transport direction or against the transport direction and which is preferably within the range of 50° to 90°.

In order to provide an efficient intermixing of the bulk material traveling through the conduit according to the invention, there are provided partition plates all of which have the same height, but which are arranged at different elevations above the bottom wall of the conduit. In this connection, it is preferable to repeat the elevational pattern of the partition walls at uniform intervals along the length of the conduit.

In order to improve the thermal insulation between the upper portion and the lower portion of the conveyor conduit according to the invention, it is advantageous to use partition walls of different height whereby only those partition walls having the largest height contact a bottom in the conduit which is impervious for the bulk material. In one embodiment of the invention, the space between the partition walls is divided by at least one porous bottom which permits the introduction of a gas into the bulk material. Preferably at least two porous bottoms are provided, whereby the porosity of the lower bottom is such that it is permeable for a gas but impervious for the bulk material. This arrangement makes it possible to fluidize the bulk material, for example, by an inert gas or to treat it with a chemically reactive gas such as oxygen.

Further, according to the invention, it is advantageous to provide baffle plates which extend from the partition plates substantially in parallel to the transport direction of the bulk material. These baffle plates may form, for example, a type of intermediate bottom extending substantially in parallel to the bottom of the conveyor conduit. In the alternative, these baffle plates may also extend substantially perpendicularly to the bottom of the conveyor conduit. This arrangement of the baffle plates prevents a thorough intermixing of the bulk material travelling in different elevational layers through the conduit. This arrangement also prevents an intermixing of the material traveling along paths through the conduit having different spacings from the longitudinal center axis of the conduit. In other words, the material portions traveling along the sides of the conduit will not be intermixed with the materials traveling centrally through the conduit.

BRIEF FIGURE DESCRIPTION

In order that the invention may be clearly understood, it will now be described, by way of example, with reference to the accompanying drawings wherein.

DETAILED DESCRIPTION OF EXAMPLE EMBODIMENTS

All the FIGS. 1 to 6 illustrate only a portion of a conduit or trough according to the invention in longitudinal section, whereby the top may be open or closed as desired. The bottom and side walls of the conduits may be made of suitable sheet metal.

Figure 1:
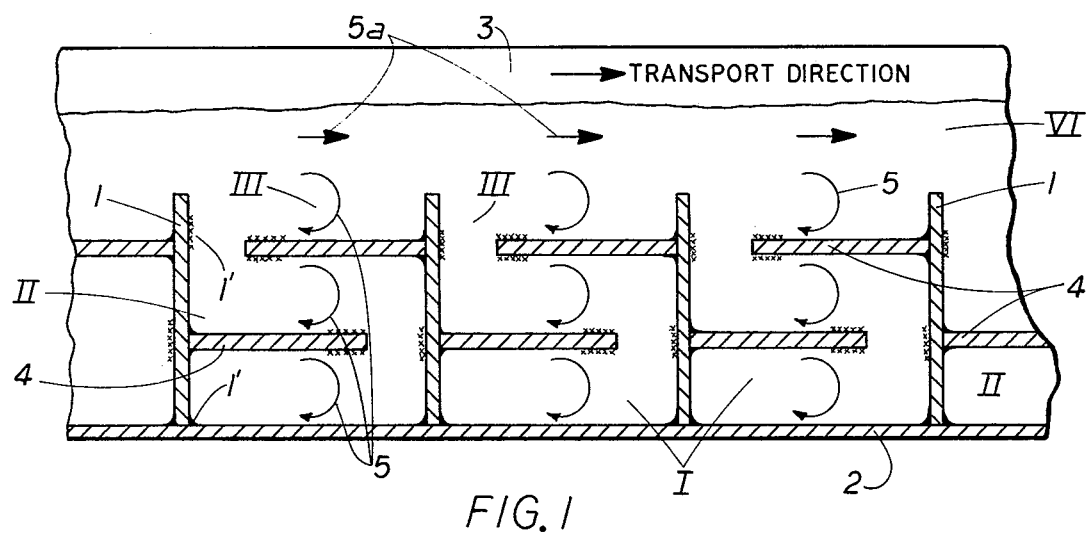
FIG. 1 illustrates a longitudinal sectional view through a conveyor conduit according to the invention, the lower portion of which is equipped with partition plates extending substantially perpendicularly to the transport direction, and wherein the partition plates are provided with baffle plates extending substantially in parallel to the transport direction.

FIG. 1 illustrates a plurality of partition plates 1, extending substantially across the transport direction of the bulk material. The partition plates 1 are secured to the bottom wall 2 and to the side walls 3 of the trough or conduit, for example by welding means 1' or the like. Any other type of connection may also be employed, for example riveting or nut and bolt connections.

Baffle plates 4 are connected to the partition plates 1, for example, also by means of welding. The baffle plates 4 extend substantially in parallel to the transport direction. These baffle plates 4 may extend away from the respective partition plate in opposite directions, as shown in FIG. 1, or they may extend in the same direction. In that instance, the baffle plates would extend from one side only of the respective partition plate and the direction of the baffle plates could be either in the transport direction or opposite thereto. These baffle plates 4 divide the space inside the conduit into several tiers, I, II, and III. The arrows 5 and 5a indicate the flow directions of the various portions of the bulk material. Thus, as shown by the arrows 5 it will be noted that the material in the range of the baffle and partition plates follows substantially a rotational movement. Contrary thereto the material outside the range of influence of the baffle and partition plates moves in a translatory manner as indicated by the arrows 5a. Thus, the bulk material VI above the partition plates 1 moves in the transport direction, whereas the bulk material intermediate the baffle and partition plates does not move in the transport direction. Moreover, there is very little intermixing between the bulk material VI and the bulk material in the tiers I, II and III. This feature of the invention has the advantage that the material which does not participate in the transport, may act as an insulating layer between the material being transported and the bottom 2 of the conveyor chute or conduit. Such a feature may, for instance, be desirable, where hot sand is to be transported. In this connection, the intermixing between the moving top layer of the bulk material VI and the material in the tiers may be further diminished by employing especially shaped partition and baffle plates. For example, these plates may have a wedge-shaped cross section. If it is necessary to subsequently remove even the slightest intermixing between the moving top portion of the bulk material and the material located intermediate the baffle and partition plates, it is possible to employ different grain sizes for the moving material and the intermediate material, whereby later on even the smallest intermixing may be removed by screening.

Figure 2:
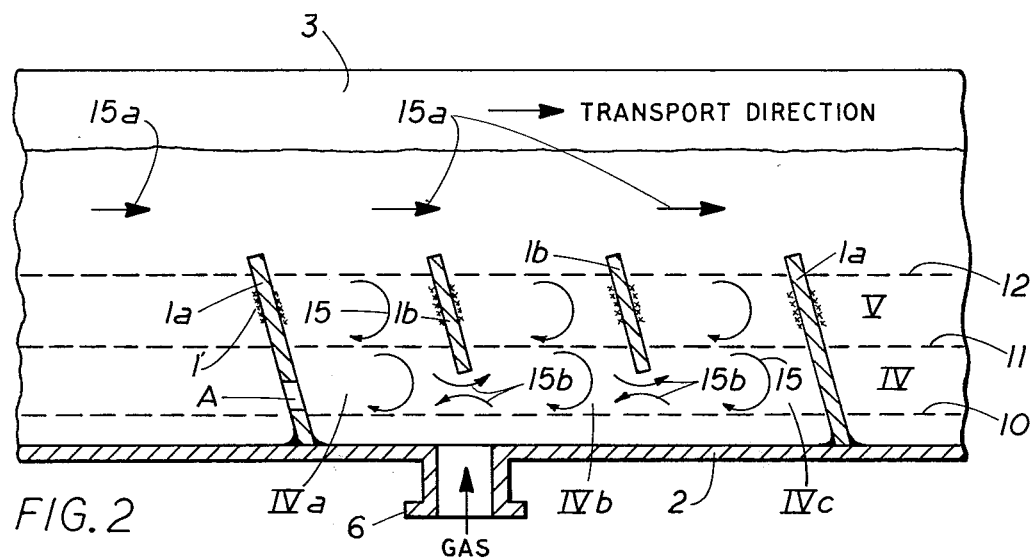
FIG. 2 is a sectional view similar to that of FIG. 1, however, the several partition plates have different heights and are arranged at an angle relative to the bottom of the conduit which is further provided with a plurality of porous intermediate bottom walls.

In the embodiment of FIG. 2 partition plates 1a and 1b are used which have different heights. Moreover, the partition plates 1a, 1b are arranged at an angle relative to the transport direction. In this embodiment, the angle opens against the transport direction and may be anywhere between 50° and 90°. The partition plates 1a having the largest height are secured so that their lower edges touch the bottom 2 of the conduit. Further, these plates may be also secured to the side walls 3, for example, by welding. The partition plates 1b of smaller height are secured only to the side walls of the conduit. The spaces intermediate the partition plates are further divided by horizontally extending porous bottom walls 10, 11 and 12. The porosity of these bottom walls is such that the bulk material may pass through the bottom walls 11 and 12, but not through the lowest bottom wall 10. These walls are shown in dashed lines to indicate their porosity.

Gas inlet means 6 are connected to the bottom 2 of the entire conduit. Thus, the gas is admitted into spaces between the bottom 2 and the porous bottom 10, whereby the gas is supplied to the bulk material. The main directions of motion of the bulk material are indicated in FIG. 2 by the arrows 15, 15a, and 15b. The movement 15a of the bulk material above the partition plates is substantially in the transport direction. The movement 15 of the material intermediate the partition plates is substantially a rotational movement. The arrows 15b indicate that in the chambers IVa, IVb and IVc which are not completely separated from each other due to the shorter height of the partition plates 1b, a material exchange takes place in the transport direction, as well as against the transport direction. It has been found that it is possible to influence the extent of intermixture between the main feed advance stream VI of the bulk material and the bulk material in the tiers IV and V by selecting the porosity of the bottoms 11 and 12.

If the pressure of the gas supplied through the inlet 6 is sufficient, it is possible to fluidize the bulk material in the conveyor conduit. In this manner it is possible to increase the speed of the material moving in the transport direction, as well as the rotational speed of the material in the tiers IV and V.

The present conveyor conduit may, for example, be used for cleaning contaminated sand, for example, sand which was exposed to an oil spill. For this purpose, the conveyor conduit is constructed in such a manner that there would be very little intermixing between the sand in the tiers V and VI or IV and V. Simultaneously, a gas containing oxygen, for example air, is supplied through the inlet 6. This feature in combination with the good thermal insulation between the bulk material intermediate the partition plates and the bulk material moving in the transport direction, as well as the small exchange or intermixing of the material located between the partition plates make it possible to heat the sand flowing in the transport direction VI to temperatures above 1,000°C without the need for the use of ceramic materials, for insulation purposes and also without the need for employing high alloyed steels for the walls of the conduit, because the thermal insulation provided by the sand in the lower tiers is enhanced by the cooling of the inflowing air. This feature of the invention constitutes a substantial technical and economic advantage as compared to conventional vibratory conveyor conduits for hot bulk materials, because heretofore such conduits had to be manufactured from high alloy steels. This feature also removes the drawback of the prior art that the resistance against wear and tear at high temperatures was rather small in prior art devices even where high alloy steels or ceramic insulating materials were used. This is so because the high temperatures used to cause warping of the prior art conduits due to heat expansion and contraction. Even the lining of prior art conduits with ceramic materials for insulation purposes did not have a sufficient resistance against wear and tear and cracking of the ceramic material due to said heat expansion and contraction could hardly be avoided heretofore.

Figure 6:
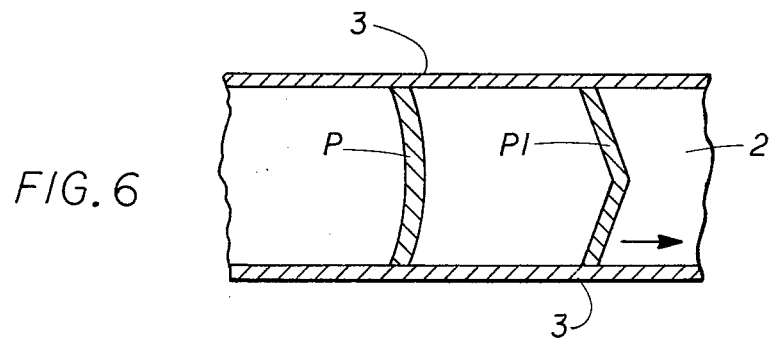
FIG. 6 is a top view on a portion of a conduit illustrating differently shaped partition plates.

The partition walls 1b convey substantially less heat to the walls of the conduit because due to their lower height, they do not touch the bottom wall of the conduit. The heat conduction of the partition walls which touch the bottom 2 may also be reduced, for example, by providing these partition plates with apertures A as shown in FIG. 2. Also, grooves could be provided in the partition plates 1a for the purpose of reducing their heat conduction. In this connection reference is made to FIG. 6 showing a top view of a section of a conduit according to the invention in which the partition plates P or P1 are slightly bent or folded in the transport direction in order to improve their ability to respond to thermal expansions and contractions.

Figure 3:
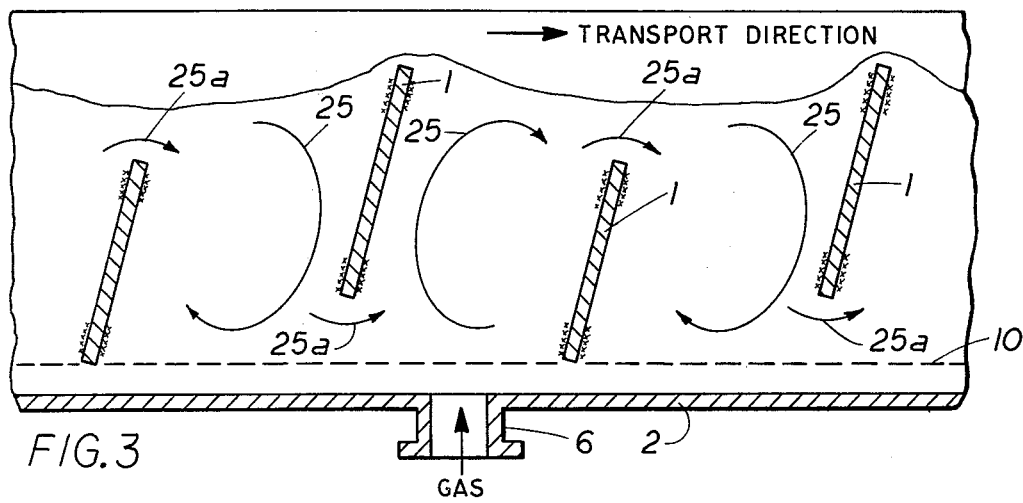
FIG. 3 illustrates an embodiment in which the partition plates all have the same height but are arranged at different elevational positions within the conduit, which is further provided with a porous bottom wall above the bottom wall proper of the conduit.

FIG. 3 illustrates an embodiment in which partition plates 1, all of which have the same height are arranged inside the conduit at different elevational positions. Thus, the partition plates with the lower elevational position touch the porous bottom 10, whereas the upper ends of the partition plates with the higher elevational position reach into the flow of the bulk material being transported. Here again, gas may, for instance, be supplied to the space between the bottom 2 and the porous bottom 10 of the conduit. The gas will enter through the porous bottom 10 to fluidize the bulk material.

The arrows 25 and 25a indicate the motion of the bulk material. A substantial proportion of the bulk material follows a rotational movement as indicated by the arrows 25, whereas the proportion of the material flowing substantially in the transport direction as indicated by the arrow 25a is relatively small. This arrangement has the advantage that the residence time of the bulk material in the conduit is easily controlled independently of the selection of any other conveying parameters.

Figure 4:
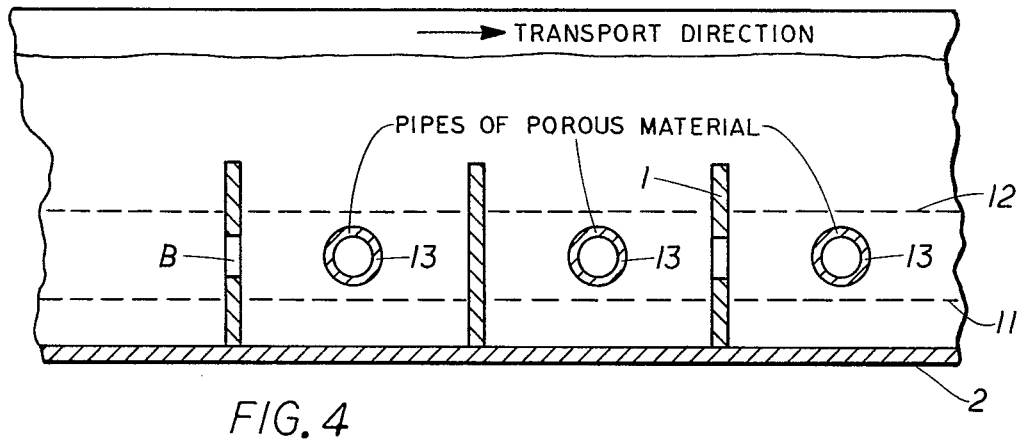
FIG. 4 illustrates an embodiment in which porous pipes extend across the transport direction through the conduits, whereby this embodiment is also provided with two porous intermediate bottoms and the pipes are arranged between these porous bottoms.

FIG. 4 illustrates an embodiment in which the lower portion of the conduit is divided by partition plates 1 which incidentally may be provided with apertures B. Further, the chambers intermediate the partition plates are subdivided horizontally by means of porous bottoms 11 and 12. Intermediate these porous bottoms 11 and 12 there are arranged pipes 13 extending substantially across the transport direction. The pipes 13 may be made for example, of sinter metal, so that a gas may be supplied to the bulk material. The motion of the material through a conduit as illustrated in FIG. 4 is substantially similar to that through the embodiment illustrated in FIG. 1, however in the embodiment of FIG. 4 the material in the space between the bottom 2 and the porous bottom 11 moves substantially slower than the remainder of the bulk material, since the material in this phase is not fluidized. Thus, a very good thermal insulation may be accomplished by the bulk material located in the space between the bottom 2 and the porous bottom 11. It will be recalled here, that the porosity of the bottoms 11 and 12 is such as to permit the passage of the bulk material therethrough. If in spite of the thermal insulation provided by the bulk material as just described, the temperature control should be insufficient, it is possible to use a double walled bottom, whereby the space between the two bottom walls could be filled with cooling water.

Figure 5:
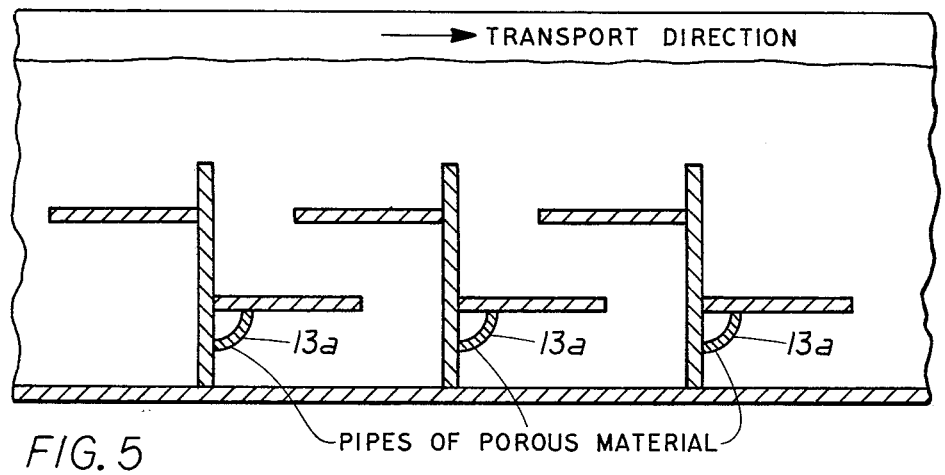
FIG. 5 illustrates an embodiment similar to that of FIG. 1, however, with the further provision of porous pipes extending across the transport direction through the conduit and forming an integral structure.

FIG. 5 illustrates an embodiment similar to that of FIG. 4. However, baffle plates are employed in FIG. 5 similarly as has been described above with reference to FIG. 1. Further, the porous pipes 13a form together with the partition plates and with the baffle plates structural units. In this manner material may be used for the porous pipes 13a which is otherwise sensitive to vibrations, because the baffle plates and the partition plates provide a protection for the vibration sensitive material of the porous pipes 13a.

With regard to FIG. 4 it should be mentioned that the elevational position of the porous pipe 13 is preferably intermediate the upper and lower end of the partition plates 1. This provides for an efficient gas supply.

In view of the above it will be appreciated that the conduit as disclosed herein is especially suitable for conveying and/or treating of bulk materials, whereby the conveying parameters may be adjusted relative to each other without influencing each other. For example, the transport speed may be lowered in order to control the simultaneous intermixing. Further, the residence time may be precisely controlled in accordance with the requirements of any particular treatment of the bulk material without regard to the other conveying parameters such as the frequency and amplitude. A very important further advantage is seen in that a portion of the bulk material itself, for example, sand may provide with its lower layer a good thermal insulation, since such lower layer moves very slowly or almost not at all, while the upper layer of the bulk material is transported relatively rapidly without any substantial intermixture with the lower layer. The lower layer, for example, a sand layer can be kept substantially stationary to provide said insulation between the hot moving sand and the conduit bottom.

In view of the above, it will be appreciated that the invention is not limited to the illustrated example embodiments. For example, it is possible to arrange all the partition walls at an intermediate height as shown in FIG. 2 for the partition plates 1b. Further, a varying speed for different layers of bulk materials may be accomplished by just employing the porous pipes 13 as illustrated in FIG. 4, whereby the material above the porous pipes is fluidized and thus moves substantially faster than the material which is not fluidized below the pipes 13. In this connection, it would be advantageous to make only the upwardly facing portion of the pipes porous for the passage of a gas therethrough. Accordingly, it will be appreciated that it is intended to cover all modifications and equivalents within the scope of the appended claims.

What is claimed is:

1. In a vibratory conveyor conduit means for transporting bulk material at elevated temperatures in a given transport direction in the conduit means by vibratory movement thereof, wherein the conduit means has a bottom wall and a pair of side walls extending in said given direction; the improvement comprising a plurality of partition plates extending substantially across said conduit means between the side walls thereof and transversely of said transport direction, said partition plates extending through only a portion of the height of said conduit means at the bottom thereof beneath the surface of the bulk material transported therein, said partition plates dividing the bottom of said conduit means into separate compartments, and a layer of insulating material in each of said compartments to form a substantially continuous insulating layer on said bottom wall in the conduit means, said partition plates holding said insulating material in said compartments against movement out of said compartments.

2. The conduit means according to claim 1, wherein said partition plates are inclined relative to the transport direction.

3. The conduit means according to claim 2, wherein said partition plates are inclined against the transport direction and form with said bottom wall an angle opening against the transport direction.

4. The conduit means according to claim 3, wherein said angle is at least about 50°.

5. The conduit means according to claim 2, wherein said partition plates are inclined in the transport direction and forming with said bottom wall an angle opening in the transport direction.

6. The conduit means according to claim 5, wherein said angle is at least about 50°.

7. The conduit means according to claim 1, wherein all of said partition plates have the same heights, said partition plates being arranged at differing spacings above said bottom wall to form an arrangement pattern which is repeated at uniform intervals along the length of the conduit means.

8. The conduit means according to claim 1, wherein said partition plates have differing heights, and wherein only the partition plates with the largest height touch said bottom wall.

9. The conduit means according to claim 1, further comprising an intermediate bottom arranged above said bottom wall, and impervious to said insulating material, at least certain of said partition plates touching said intermediate bottom.

10. The conduit means according to claim 1, further comprising intermediate bottom means of porous material arranged between adjacent partition plates.

11. The conduit means according to claim 10, wherein said intermediate bottom means comprise at least two bottoms of porous material one arranged above the other whereby the lower bottom of the two bottoms has such a porosity that the lower bottom is impervious to said insulating material but capable of passing a gas into said bulk material.

12. The conduit means according to claim 1, further comprising baffle plates secured to said partition plates, said baffle plates extending substantially in parallel to said transport direction.

13. The conduit means according to claim 1, further comprising holes in said partition plates.

14. The conduit means according to claim 1, further comprising pipes of porous material arranged to extend between adjacent partition plates substantially across the transport direction, and means connected to said pipe means for supplying a gas to said insulating material through said porous pipe means.

15. The conduit means according to claim 14, wherein said pipes are arranged substantially intermediate the upper and lower edges of said partition plates.

16. The conduit means according to claim 1, wherein said layer of insulating material is a layer of said bulk material.

17. The conduit means according to claim 1, further comprising baffle plates and porous pipes forming with said partition plates a structural unit.

18. The conduit means according to claim 1, wherein said partition walls are bent in the transport direction to compensate for temperature expansions and contractions.

19. The conduit means according to claim 1, wherein said partition plates are slightly bent in the transport direction, whereby temperature expansions and contractions of said conduit means are compensated.

* * * * *